Figure 1:
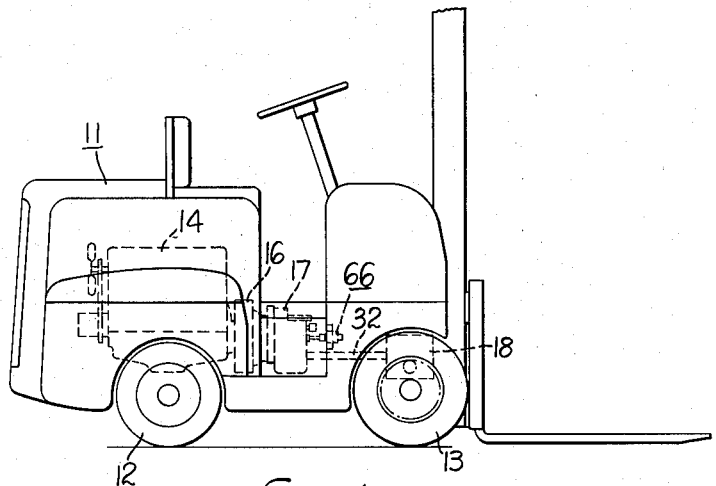

May 10, 1966

F. C. SCHUSTER ETAL 3,250,142

TRANSMISSION INTERLOCK TO PREVENT SHIFTING
WHILE VEHICLE IS IN MOTION

Filed Dec. 12, 1963

Inventors
Frank C. Schuster
Neil J. Ryskamp
By Charles L. Schwab
Attorney

United States Patent Office 3,250,142
Patented May 10, 1966

3,250,142
TRANSMISSION INTERLOCK TO PREVENT SHIFTING WHILE VEHICLE IS IN MOTION
Frank C. Schuster, Chicago, and Neil J. Ryskamp, Markham, Ill., assignors to Allis-Chalmers Manufacturing Company, Milwaukee, Wis.
Filed Dec. 12, 1963, Ser. No. 330,109
4 Claims. (Cl. 74—336.5)

This invention relates to means for preventing shifting of a power shift transmission of a motor vehicle while the motor vehicle is in motion.

In power shift transmission vehicles, it has been found that the operator may abuse the transmission clutches by engaging them while the vehicle is in motion. This has been particularly true where forward and reverse operations of a vehicle are effected by fluid actuated clutches and the operator shifts between forward and reverse without first bringing the vehicle to a halt. In effect, the operator uses the transmission clutches for braking the vehicle which results in excessively rapid wear of the transmission clutches. Since in most power shift transmissions the replacement of a transmission clutch is much more expensive than replacing brake linings, it is desirable to force the driver of the vehicle to use the regular wheel brake system rather than the transmission clutches for braking the vehicle.

In lift truck power trains it is common to use a torque converter between the engine and the power shift transmission. The torque multiplication produced by the torque converter increases the abuse which the operator can impose on the power shift transmission clutches.

Accordingly, it is an object of this invention to provide a means for preventing shifting of a power shift transmission while the vehicle is in motion.

It is a further object of this invention to provide means for preventing the shifting of a power shift transmission between forward and reverse ranges while the vehicle is in motion.

It is a further object of this invention to provide an electrically energized means for preventing control valve of a power shift transmission from being shifted while the ground driven elements of the vehicle power train are in motion.

It is a further object of this invention to provide a mechanism of the type hereinbefore outlined wherein the electrically actuated means for preventing shifting of the control valve of the power shift transmission is controlled by a rotary motion sensitive switch connected to one of the ground driven elements of the vehicle power train.

It is a further object of this invention to provide, in combination with a vehicle having a torque converter and power shift transmission, means for automatically preventing shifting of the power shift transmission while the vehicle is in motion.

Figure 2:
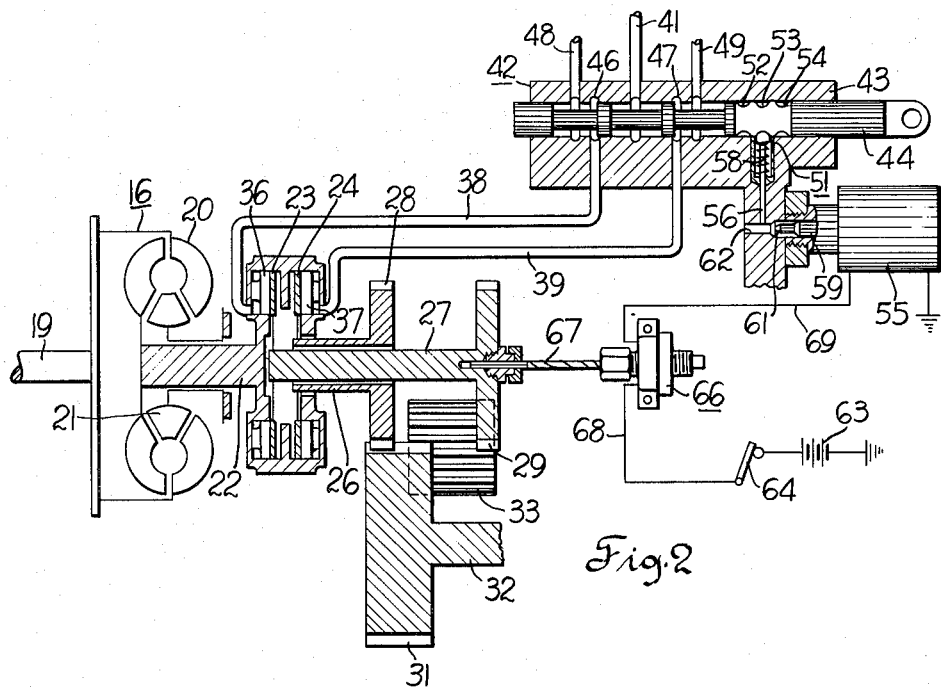

These and other objects of this invention will be apparent to those familiar with the art when the following description is read in conjunction with the drawings in which:

FIG. 1 is a side view of a lift truck in which the present invention is incorporated; and FIG. 2 is a schematic illustration of the torque converter and power shift transmission together with automatic means for preventing shifting gears while the vehicle is in motion.

Referring to FIG. 1, the lift truck 11 includes a pair of steerable wheels 12 and power driven wheels 13 connected to an engine 14 through the power train including a torque converter 16, a power shift transmission 17 and final drive 18 connected by shaft 32 to the transmission 17. The truck is equipped with either two wheel or four wheel brakes, not shown.

Referring to FIG. 2, an engine driven shaft 19 is connected to the pump element 20 of a hydrokinetic torque converter 16 and the turbine element of the torque converter 16 is connected to the transmission input shaft 22. The bladed stator 21 is fixed to the torque converter housing in a conventional manner. A pair of fluid actuated friction disk clutches 23, 24 are interposed between the input shaft 22 and a pair of transmission shafts 26, 27. The transmission shafts 26, 27 have gears 28, 29 fixed thereto which mesh with a gear 31 secured to the output shaft 32 and idler gear 33, respectively. The transmission output shaft 32 is connected to the final drive 18 which includes a differential, not shown. Inasmuch as the gears 28, 29, 33, 31 rotate whenever the driving wheels 13 rotate, these components are referred to as ground driven elements of the vehicle power train.

Fluid actuators 36, 37 are provided for the clutches 23, 24, respectively, and as schematically shown, these actuators are supplied fluid through conduits 38, 39, respectively. A suitable source of pressure fluid is supplied, by an engine driven pump, not shown, to the fluid actuated clutches by way of a supply conduit 41 connected to the transmission valve 42. The transmission valve 42 includes a housing 43 and a shiftable flow control member 44 connected to a manually operated control linkage, not shown. When the flow control member 44 is shifted to the right pressure fluid is supplied to actuator 37 through port 47 to which conduit 39 is connected. When the flow control member 44 is shifted to the left, supply conduit is connected to port 46 which communicates with actuator 36 through conduit 38.

As illustrated, both of the clutches are disengaged and conduits 38, 39 are connected to reservoir through return to reservoir lines 48, 49. When fluid is supplied to clutch actuator 36, the truck is driven in reverse through gears 29, 33, 31 and when actuator 37 engages clutch 24 the vehicle is driven forward through gears 28, 31.

The interlock means of this invention prevents movement of the flow control member 44 from its neutral and clutch actuating positions while the vehicle is in motion. The interlock means includes a detent mechanism 51 comprising three angular recesses 52, 53, 54 formed on the flow control member 44 and a locking element 56, the upper end of which is engageable with the recesses 52, 53, 54.

The interlock means also includes an electrically energized means in the form of a solenoid 55 which is provided for maintaining the locking element 56 in a locking position, as illustrated. The solenoid 55 has a reciprocable plunger 59 with a rounded end portion 61 which when energized will extend into opening 62 and into abutable relation with the bottom end of the locking element 56. The locking element 56 is resiliently held in its locking position by a spring 58. An electric circuit is provided for the electrically energized solenoid 55 and includes a source of electrical power such as a battery 63, ignition switch 64, and a rotary motion sensitive switch 66, which has its sensing element 67 connected for rotation with ground driven element 29. The switch 66 is interconnected with switch 64 and solenoid 55 by suitable leads 68, 69.

Whenever the vehicle is in motion, ground driven element 29 will rotate and motion sensitive switch 66, which is mounted on the chassis of the vehicle, will open and interrupt the flow of current from lead 68 to lead 69, thus deenergizing the solenoid 55 and permitting the plunger 59 to be shifted to its locking position to the left by the usual spring, not shown, in the solenoid. Thus when the vehicle is in motion, the locking element 56 will be in its locking position, as illustrated, and the operator will not be able to move the flow control member 44 through manual control linkage, not shown. Thus the operator is forced to use the vehicle brakes rather than the clutches of the transmission to accomplish braking of the vehicle. It will be noted that if one of the vehicle clutches is engaged, and the vehicle is in motion, the operator will not be able to shift to a different gear unless the vehicle is brought to a stop. As illustrated, this invention is employed in a power shift transmission utilizing the single forward speed clutch and a single reverse speed clutch. If the operator were allowed to use the forward reverse clutches 23, 24 to reverse vehicle direction without using the vehicle brakes, considerable energy would be absorbed by the clutches. The use of a hydrokinetic torque converter 16 amplifies the wear problem of clutches 23, 24 since the increased input torque transmitted by input shaft 22 is transmitted to the engaged clutch and gear train. In addition to the rapid wear of clutches 23, 24, the torque transmitted by the torque converter 16 to the transmission gears, in such a direction reversing practice, may be excessive thereby causing premature gear and/or shaft failure.

Although a single embodiment of this invention has been illustrated and described, it is not intended to limit this invention except as necessitated by the scope of the appended claims.

The embodiments of the invention in which an exclusive property or privilege is claimed are defined as follows:

1. Means for preventing shifting of a vehicle transmission while the vehicle is in motion, comprising:
  a vehicle power train including
    an input shaft,
    change speed gearing including a plurality of rotary ground driven elements, and
    a pair of fluid actuated clutches operatively interposed between said input shaft and a pair of said ground driven elements, respectively,
  fluid control means for selectively engaging said fluid actuated clutches including a control valve having a flow control member shiftable from a neutral position to a pair of clutch actuating positions, and
  interlock means preventing movement of said flow control member when the vehicle is in motion including
    a detent mechanism for said flow control member having a locking element shiftable between a locking position in which said flow control member is locked against shifting and a releasing position in which said flow control member is not locked against shifting,
    electrically energized means for holding said locking element in its locking position, and
    an electric circuit for said electrically energized means including a rotary motion sensitive switch connected to one of said ground driven elements, said locking element being held in its locking position when said one ground driven element is rotating.

2. In combination with a vehicle having an engine:
  a vehicle power train between the engine and the driving wheels including
    an input shaft,
    a torque converter having a pump element connected to said engine and a turbine element connected to said input shaft,
    change speed gearing including a plurality of rotary ground driven gears, and
    a pair of fluid actuated clutches operatively interposed between said input shaft and a pair of said ground driven gears, respectively,
  fluid control means for selectively operating said fluid actuated clutches including a control valve having a flow control member shiftable from a neutral position to a pair of clutch actuating positions, and
  interlock means preventing movement of said flow control member when the vehicle is in motion including
    a detent mechanism for said flow control member having a locking element shiftable between a locking position in which said flow control member is locked against shifting and a releasing position in which said flow control member is not locked against shifting
    electrically energized means for holding said locking element in its locking position and
    an electric circuit for said electrically energized means including a rotary motion sensitive switch connected to one of said ground driven gears, said locking element being held in its locking position when said one ground driven gear is rotating.

3. Means for preventing shifting of a vehicle transmission while the vehicle is in motion, comprising:
  a vehicle power train having
    engine driven elements including
      an input shaft, and
    ground driven elements including a plurality of gears and
    a pair of fluid actuated clutches operatively interposed between said input shaft and a pair of said gears, respectively,
  fluid control means for selectively operating said fluid actuated clutches including a control valve having a flow control member shiftable from a neutral position to a pair of clutch actuating positions, and
  interlock means preventing movement of said flow control member when the vehicle is in motion including
    a detent mechanism for said flow control member having a locking element shiftable between a locking position in which said flow control member is locked against shifting and a releasing position in which said flow control member is not locked against shifting
    electrically energized means for holding said locking element in its locking position and
    an electric circuit for said electrically energized means including a rotary motion sensitive switch connected to one of said ground driven elements, said locking element being held in its locking position when said one ground driven element is rotating.

4. In combination with a vehicle having an engine:
  a vehicle power train having
    engine driven elements including
      a torque converter connected to said engine
      a transmission input shaft connected to said torque converter, and
    ground driven elements including a plurality of transmission gears and
    a pair of fluid actuated clutches operatively interposed between said input shaft and a pair of said gears, respectively,
  fluid control means for selectively operating said fluid actuated clutches including a control valve having a flow control member shiftable from a neutral position to a pair of clutch actuating positions, and
  interlock means preventing movement of said flow control member when the vehicle is in motion including
    a detent mechanism for said flow control member having a locking element shiftable between a locking position in which said flow control member is locked against shifting and a releasing position in which said flow control member is not locked against shifting electrically energized means for holding said locking element in its locking position, and
an electric circuit for said electrically energized means including a rotary motion sensitive switch connected to one of said ground driven elements, said locking element being held in its locking position when said one ground driven element is rotating.

References Cited by the Examiner

UNITED STATES PATENTS

| | | | |
|---|---|---|---|
| 2,804,186 | 8/1957 | Kier et al. | 192—114 |
| 3,159,043 | 12/1964 | Herman | 74—336.5 |
| 3,199,698 | 8/1965 | Schuster | 180—82 |

DAVID J. WILLIAMOWSKY, *Primary Examiner.*

H. S. LAYTON, *Assistant Examiner.*